United States Patent [19]

Nakamura et al.

[11] Patent Number: 5,581,785
[45] Date of Patent: Dec. 3, 1996

[54] STARTING SYSTEM OF DISK STORAGE DEVICE AND DATA READING/WRITING SYSTEM OF THE SAME

[75] Inventors: Kunihiro Nakamura, Nagano; Yasuyuki Masunaga, Tokyo, both of Japan

[73] Assignee: Fuji Electric Co., Ltd., Kawasaki, Japan

[21] Appl. No.: 278,085

[22] Filed: Jul. 20, 1994

[30] Foreign Application Priority Data

Jul. 27, 1993 [JP] Japan .................... 5-184268

[51] Int. Cl.⁶ ........................................ G06F 13/00
[52] U.S. Cl. .............. 395/828; 395/481; 395/497.01; 395/830; 395/430; 395/438; 395/651; 364/DIG. 1
[58] Field of Search .................... 395/427, 430, 395/481, 497.01, 700, 827, 828, 830

[56] References Cited

U.S. PATENT DOCUMENTS

| 4,788,672 | 11/1988 | Toyooka et al. ............ 369/32 |
|---|---|---|
| 5,101,490 | 3/1992 | Getson, Jr. et al. ............ 395/430 |
| 5,150,473 | 9/1992 | Zulch ............ 395/489 |
| 5,233,591 | 8/1993 | Nishihara ............ 369/54 |
| 5,269,019 | 12/1993 | Peterson et al. ............ 395/600 |
| 5,381,478 | 1/1995 | Iijima ............ 380/44 |
| 5,388,016 | 2/1995 | Kanai et al. ............ 360/72.1 |

*Primary Examiner*—Frank J. Asta
*Attorney, Agent, or Firm*—Kanesaka & Takeuchi

[57] ABSTRACT

The non-volatile memory like an EPROM is built in the disk storage device in association with the built-in processor. The non-volatile memory stores the directory data of the setting data necessary for loading the basic program to the computer. The non-volatile memory also stores the directory data of the stored disk data to omit track seek time of the head and rotation time of the disk during the data reading/writing operation. Thus, it is possible to shorten the preliminary starting time from power supply connection until the host computer is accessible to the disk storage device, and the access time at every data reading/writing operation.

7 Claims, 3 Drawing Sheets

STARTING SYSTEM OF DISK STORAGE DEVICE AND DATA READING/WRITING SYSTEM OF THE SAME

BACKGROUND OF THE INVENTION AND RELATED ART STATEMENT

The present invention relates to a disk memory or storage device, such as fixed disk device, having a non-volatile memory built in association with a processor thereof, in particular a system for setting or starting the disk storage device when a host computer is started, and a data reading/writing system for exchanging data between the host computer and the disk storage device as a peripheral storage device of the host computer.

A disk memory or storage device, which is employed as a built-in or peripheral large capacity storage device of a computer, is started in association with the computer, since the disk storage device memorizes, as is well known, a basic program including an operating system or the like which is a software pertinent to the basic operations of the computer. After the OS (operating system) or DOS (disk oriented operating system) is set up in the computer, the disk storage device starts reading/writing operation of data on the basis of a command or designation from the computer. Operations of the disk storage device at the time of starting and data reading/writing are outlined below, though the operation is well known.

The disk memory or storage device starts together with the computer. Namely, the disk storage device connected to a power supply self-inspects its electronic circuits, then drives a spindle motor to start rotating its disk and checks whether the disk reaches a normal rotation rate. At this stage, the disk storage device is ready to execute reading/writing operation. However, when the disk storage device is associated with the computer, since the contents designated by the computer are permanently memorized in the disk as setting data for the type of devices or individual devices, if the contents in the disk storage device are not reads out, the operation can not be actually carried out. Thus, after reading the setting data in a processor of the disk storage device, a message of completion of the preliminary operation is sent to the computer.

On the other hand, after power is supplied to the computer, the computer reads out its basic input/output system (hereinafter referred to as BIOS) or an input/output control program (hereinafter referred to as IO control) from a read only memory (hereinafter referred to as ROM), executes self-inspection, and then waits for the above completion message from the disk storage device. As soon as the computer receives the completion message, the computer contacts the disk storage device, and reads out the basic program including the aforementioned IO to load in the computer. Thus, the starting operation of the computer and disk storage device is completed.

When the data is read and written, reading/writing command is supplied from the computer. Since the disk storage device stores, in a specific zone of the disk, so-called directory data indicative of a head address or the like of every data or files stored in the disk storage device, when the reading/writing command is received, the directory data relative to the designated data is read from the specific zone, and then the reading/writing operation for the designated data is carried out in a region of the disk having the address.

In case of reading data, it is not necessary to rewrite the directory data. However, in case of rewriting data and if the directory data to be written is different from the old data, the directory data is rewritten. Of course, when new data is written, the disk storage device stores the directory data in the specific region.

The disk memory or storage device according to the prior art requires considerably long time in starting its operation in the above described manner. Thus, it has been requested to shorten the starting time. Also, so-called access time of the disk storage device measured from the computer, from receiving of a command to a completion of the operation, is long. Thus, it has been requested to shorten the access time.

In a long case, it takes about 10 second to start the disk storage device. In a note type or wrap top type computer that employs a cell as a power supply and connects and disconnects the power supply quite intermittently so as to extend life of the cell, it wastes at every starting operation the corresponding preliminary operation time, which has been required to at least half time. In order to satisfy the requirement, it is effective to shorten the self-inspection period and the preliminary setting period for the disk rotation, but those shortening of operation periods are not enough, in practice, to halve the starting time.

In regard to the reading/writing, since the reading/writing operation is executed much more frequently than the starting operation of the disk storage device, the access time described above is strongly required to be reduced. For this purpose, it is effective to shorten the time for moving a read/write head to a desired track and positioning the track stably thereon by improving an actuation system or positioning system of the read/write head. The access time may be shortened by up to several percent, but it is quite hard to shorten the access time more than 10% by the improvement of the actuation or positioning system.

In view of the foregoing, an object of the present invention is to shorten the starting time and access time at the data reading/writing operation, which occupy most parts of the waste time of the disk memory or storage device viewed from the computer side.

SUMMARY OF THE INVENTION

The aforementioned object is achieved by the starting system of a disk memory or storage device of the invention. In the system, non-volatile memory means is built in the disk storage device, wherein when loading a basic program for operation of a host computer to a disk of the disk storage device, the setting data necessary for loading to the host computer is stored in advance to the non-volatile memory means; and at a time of starting the storage device, the setting data is read from the non-volatile memory means to the data processing means for a time shorter than the operation time of the disk during or parallel to the starting operation of rotating the disk. Thus, after the starting operation of the disk is completed, it is possible to directly reach from the host computer to the basic program stored in the disk.

In the starting system, the basic program loaded from the disk storage device to the host computer when the host computer is started forms an operating system.

The object of the present invention is also achieved by a data reading/writing system for a disk memory or storage device. The disk storage device comprises non-volatile memory means built in the disk storage device in association with the processor thereof, wherein directory data including addresses of data stored in a disk of the disk storage device is stored in the non-volatile memory means; when the data is read, the directory data relative to the data is at first read from the non-volatile memory means and then operation for reading the data from the disk is started; and when the data is written, the directory data thereof is rewritten in the non-volatile memory means.

The data reading/writing system employs the non-volatile memory means comprising an electrically rewritable read only memory.

In the starting system described above, the operating systems including DOS or the like are usually employed as the basic program loaded from the disk storage device to the computer when the computer is started. It is preferable to employ an electrically rewritable ROM like erasable and programmable read only memory (EPROM) as the non-volatile memory. Also, when the directory data is memorized in the non-volatile memory at the time of writing the data, if the directory data is different from the previous directory data, the directory data is rewritten, and if it is new data, directory data thereof is written in the non-volatile memory.

The present invention considers the drawback of the prior art that spends considerably long time in reading out the setting data in the starting operation of the disk storage device and in reading out the directory data in the data reading/writing operation. The present invention greatly reduces the starting time and the access time at the reading/writing operation by shortening the period of time spent on reading out the directory data and the setting data by means of storing the data in the non-volatile memory built in the disk storage device in association with the processor or computer as described in the preceding paragraphs.

Namely, in reading the setting data and the reading/writing data, it takes from 0.5 to 2 second according to the prior art, since it requires at least a period of time corresponding to one turn of the disk in addition to the period of time for seeking a track and positioning the read/write head on the track on which the setting data or the director data is stored. According to the present invention, the starting time at the starting operation and the access time at data reading/writing operation are shortened down to around one half of the prior art by reading out the setting data and directory data from the non-volatile memory in a negligibly short period of time in comparison with those of the prior art.

DETAILED DESCRIPTION OF A PREFERRED EMBODIMENT

Now the present invention will be described in detail hereinafter with reference to the accompanied drawings which illustrate a preferred embodiment of the present invention.

Figure 1A:
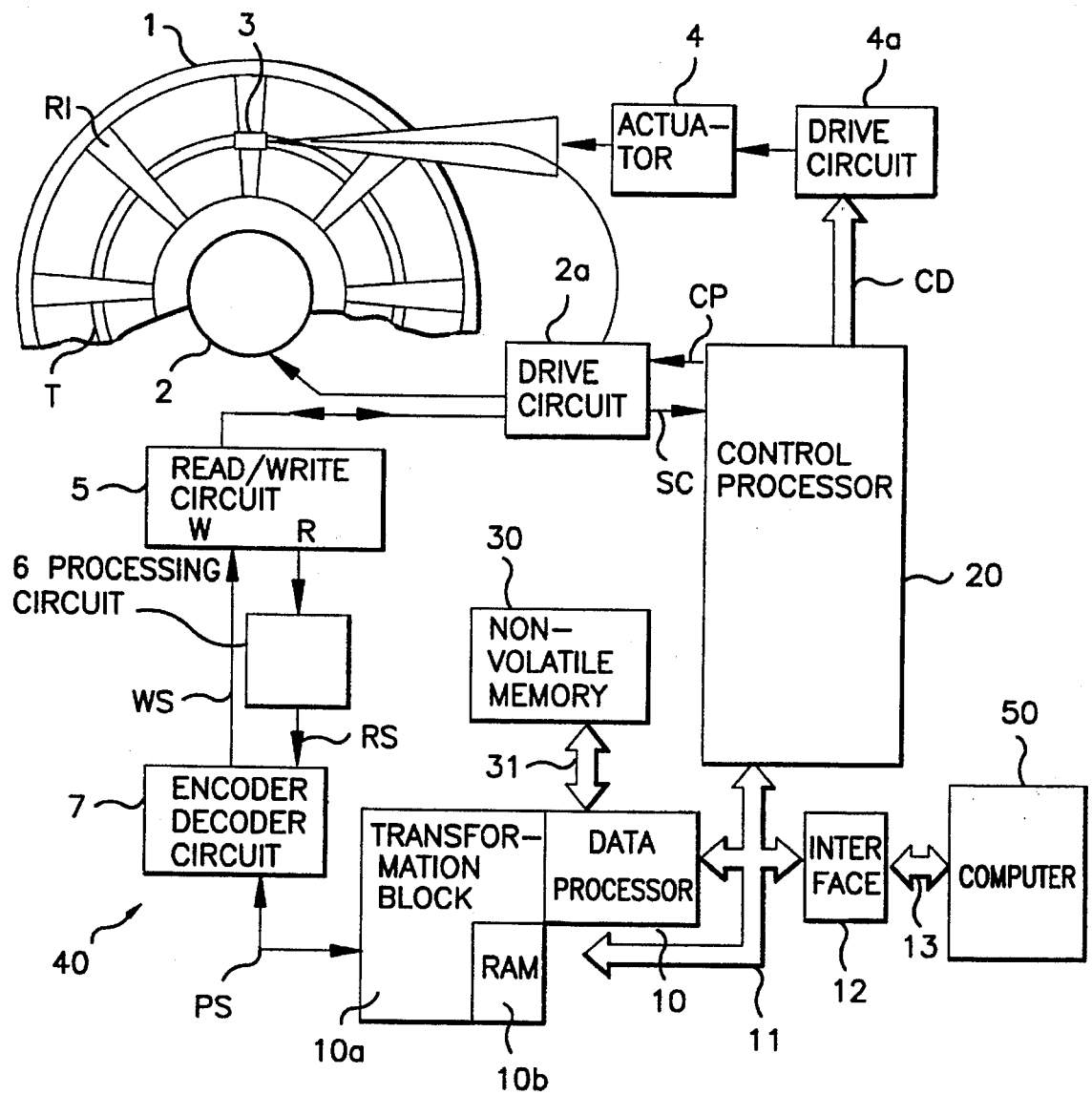
FIG. 1(a) is a block diagram of a disk storage device for explaining the embodiment of the present invention.
Figure 1B:
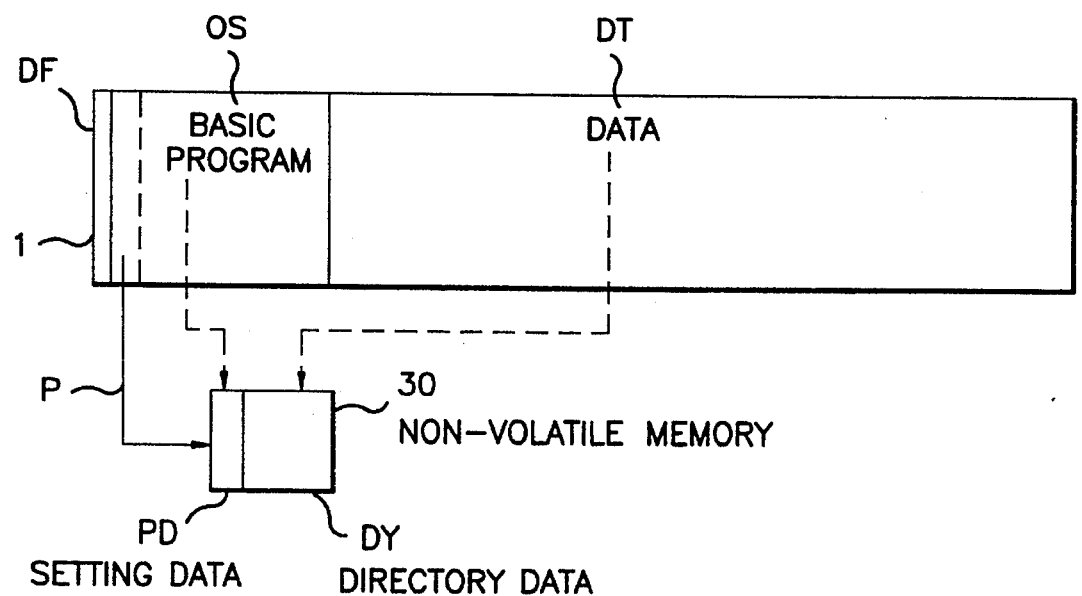
FIG. 1(b) is a block diagram for schematically showing memory structure and the disk.
Figure 2:
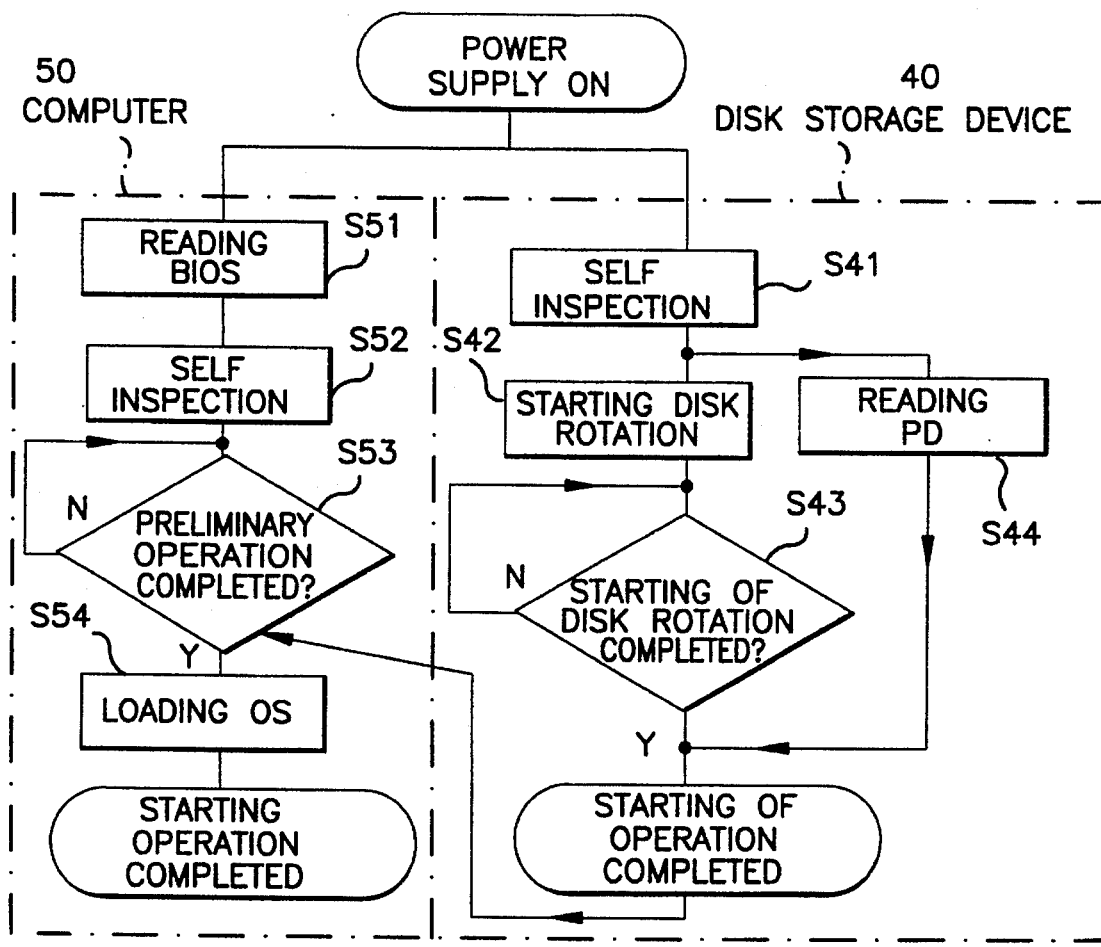
FIG. 2 is a flow chart for explaining the starting operation of the disk storage device of the present invention.
Figure 3A:
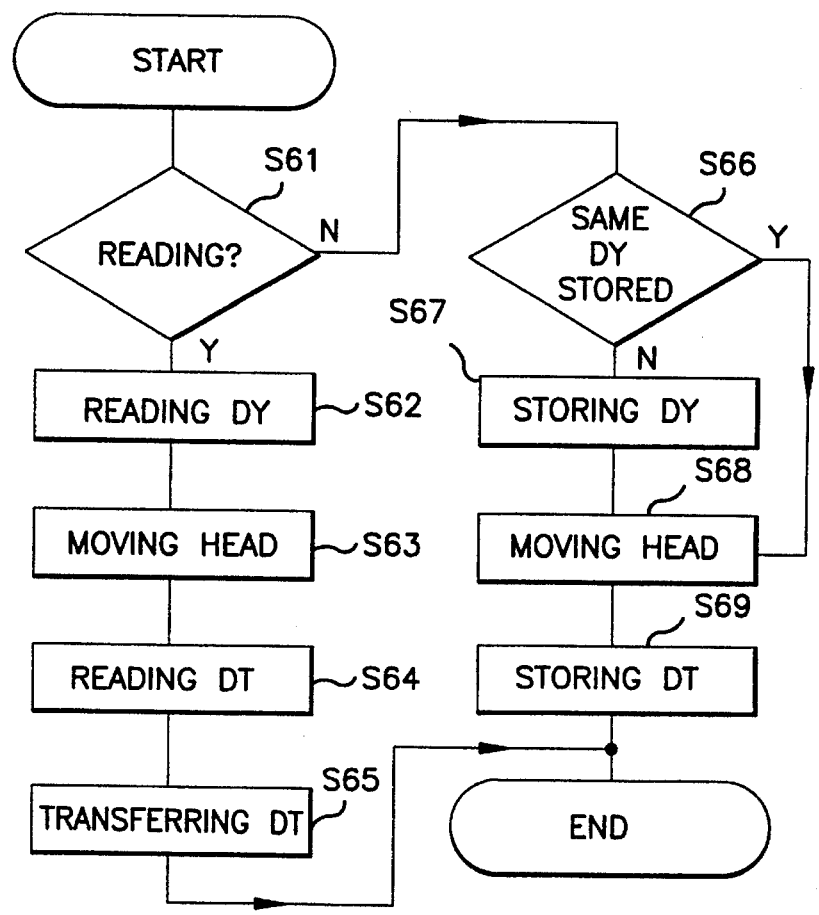
FIG. 3(a) is a flow chart for explaining the data reading/writing operation of the disk storage device of the present invention.
Figure 3B:
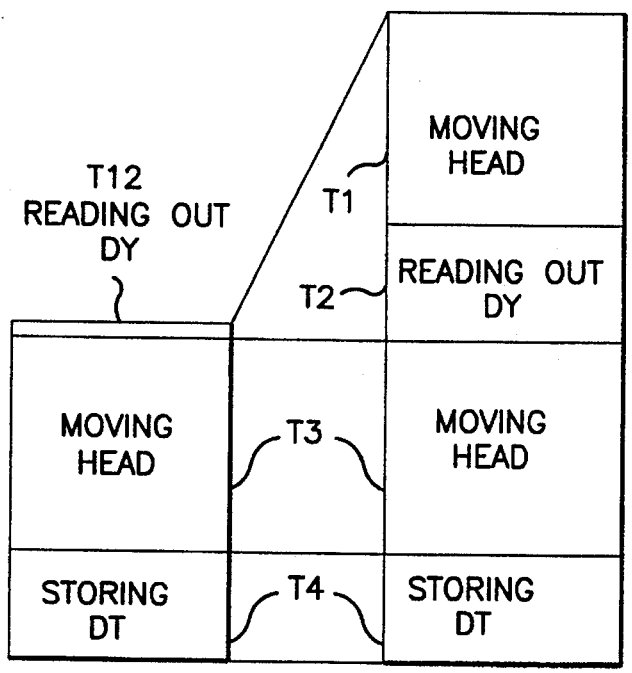
FIG. 3(b) is a diagram for comparing data reading/writing time of the present invention with that of the prior art.

FIG. 1(a) schematically shows a structure of a disk and a disk storage device to which the starting and data reading/writing systems of the present invention are adapted, and FIG. 1(b) shows an example of a memory area assignment in the non-volatile memory of the present invention. FIG. 2 is a flow chart illustrating the starting operation according to the present invention. FIG. 3(a) shows a flow chart illustrating the data reading/writing operation according to the present invention, and FIG. 3(b) is a diagram comparing time spent on the data reading/writing operation of the present invention and that of the prior art. The embodiments of the present invention are described on a hard disk drive as the disk storage device, but the present invention is applicable not only to the hard disk drives but also to all the other disk storage devices without departing from the true spirit of the invention.

Now, a structure of a disk storage device 40 is explained with reference to FIG. 1(a). A disk 1 shown on the upper left of FIG. 1(a) is driven by a spindle motor 2 at a constant rotation rate. On the disk 1, reference data RI including servo data is distributed and stored along the circumferential direction of the disk 1, and tracks T are defined between the reference data RIs at the time of formatting. Position of a read/write head 3 along the radial direction of the disk 1 is controlled by an actuator 4, and a drive circuit 4a which receives control command CD from a control processor 20 is formed.

A drive circuit 2a of the spindle motor 2 receives clock pulse CP from the control processor 20 and feeds back a start completion signal SC to the control processor 20 when the spindle motor 2 reaches a rotation rate designated by the clock pulse CP. The control processor 20 is built in the disk storage device 40 for driving the spindle motor 2, controlling the position of the head 3 and so on.

A read/write circuit 5, connected to the read/write head 3 provided to each surface of the disk 1, brings, as is usually so, the read/write head 3 designated by the control processor 20 to a reading or writing mode. A read-out signal RS is fed from the read/write circuit 5 to an encoder/decoder circuit 7 via a signal processing circuit 6 and decoded to a pulse train PS in the encoder/decoder circuit 7.

A data processor 10 is built in the disk storage device 40 for exchanging command signals or data with a host computer 50. The data processor 10 receives the pulse train PS at a transformation block 10a to transform to data and temporarily stores the data in a random access memory (RAM) 10b, or in reverse, transforms the stored data to the pulse train PS and feeds the pulse train PS to the encoder/decoder circuit 7. The encoder/decoder circuit 7 encodes the pulse train PS to a write-in signal WS and feeds the write-in signal WS to the read/write circuit 5. The data processor 10 is connected to the computer 50 via an internal bus 11, an interface 12 and an external bus 13, and cooperates with the control processor 20 via the internal bus 11.

A non-volatile memory 30 is built in the disk storage device 40 described above for adapting the present starting and data reading/writing systems of the invention. In the embodiment of FIG. 1, the non-volatile memory 30 is connected to the data processor 10 via a bus 31. The non-volatile memory 30 for the starting system may be a read only memory (ROM). However, an electrically rewritable ROM is preferable as the non-volatile memory 30, and an EPROM, more specifically an electrically erasable programmable read only memory ($E^2$PROM) is employed in this embodiment. FIG. 1(b) shows a memory structure of the non-volatile memory 30 in conjunction with the memory structure on the disk 1.

FIG. 1(b) schematically shows in its upper half a memory area of the disk 1. The computer 50, as a user of the disk 1, can be accessible to the entire area except for a narrow system data region DF shown in the left hand side of the figure. Though setting data PD and directory data DY are stored in the system data region DF usually defined in the outermost peripheral region of the disk 1 according to the prior art, the setting data PD and directory data DY are transferred in the non-volatile memory 30 as shown by an arrow P in FIG. 1(b) according to the present invention. In the present invention, only a few kinds of data including defect data of the memory surface of the disk 1, maximum number of cylinders which can be set, formatting data, etc. are stored in the system data region DF. Most of the other part of the memory area of the disk 1 is zoned for a user region which usually stores a basic program OS, data DT, etc.

As shown in FIG. 1(b), the setting data PD of the basic program OS and the directory data DY of the stored data DT are stored in the non-volatile memory 30 in the present embodiment. It is preferable to store, as the setting data, addresses on the disk 1 necessary for initially loading DOS, etc. as the basic program OS for operation of the computer 50 as well as the basic data for operation of the disk storage device 40 including number of cylinders employed, number of re-try of read/write operation and so on. The directory data DY preferably includes file titles of the data DT stored on the disk 1 as well as head addresses and data length of the directory data DY.

The setting data PD is usually designated from the computer 50 for each type of the disk storage device or for each disk storage device when the disk storage device 40 is coupled with the computer 50. The directory data DY is edited and stored in the non-volatile memory 30 when new data DT or files is stored in the disk storage device 40. The directory data DY is updated, if necessary, every time when the data DT is re-written.

Now an embodiment of starting operation is explained with reference to FIG. 2 which illustrates a flow chart of the starting operation. In the figure, the operation of the computer 50 is separated by single-dotted chain lines from the operation of the disk storage device 40. The operations on both sides are initiated by connection of the power supply. On the side of the computer 50, the computer 50 reads BIOS, i.e. the basic IO system, from its ROM in step S51, self-inspects or checks its RAM and its internal connection in step S52, and then waits for a message indicating completion of the preliminary operation (preliminary operation completion message) from the disk storage device 40 in step S53.

On the side of the disk memory or storage device 40, the disk storage device 40 executes similar self-inspection or check in step S41 as in the computer 50 in the step S51. Then, the disk storage device 40 starts rotation of the disk in step S42, and waits for completion of S42 in step S43, while the disk storage device 40 reads the setting data PD in step S44, parallel to the steps S42 and S43. As is apparent from FIG. 1(a), the steps S42 and S43 are executed by the control processor 20 as the operation of the drive circuit 2a of the spindle motor 2, and in the step S44, data processor 10 reads out the setting data PD from the non-volatile memory 30.

Since the step S44 proceeds faster than the steps S42 and S43, when the start completion signal SC from the drive circuit 2a indicates completion of the starting operation, the storage device 40 is in the completion of the starting operation, so that the disk storage device 40 sends preliminary operation completion message to the computer 50. As soon as the computer 50 receives the preliminary operation completion message, the computer 50 shifts from the step S53 to step S54, in which the computer 50 loads therein the basic program OS including an initializing program and DOS program read from the disk storage device 40, and then completes the starting operation of the computer 50.

The starting operation time of the present invention described above is compared with that of the prior art below. As described earlier, the steps S42, S43 and S44 of FIG. 2 are executed in series according to the prior art. It takes about 2 seconds for the step S41, from 2 to 6 second for each step S42 and S43, and at least from 1 to 2 second for the step S44, since the step S44 includes shift of the head position and at least one turn of disk rotation in reading the setting data PD. So, it takes from 5 to 10 seconds for the total starting operation according to the prior art.

According to the present invention, since it takes from several to several tens millisecond for reading-in the setting data in the step S44, which is negligibly short in comparison with the other steps, the period of time spent on the starting operation is shortened to from 4 to 8 second. This time reduction may be considered not to be long enough, but it is effective especially for the computers provided with so-called resume-function which intermittently connects and disconnects its power supply. The time reduction scheme effectively halves the starting operation period if combined with reductions of the self inspection period and starting period of the disk rotation.

An embodiment of the data reading/writing operation of the invention is explained with reference to flow chart of FIG. 3(a). The operation of FIG. 3(a) starts when the disk storage device 40 receives a read/write command from the computer 50. The first step S61 judges whether the command from the computer 50 designates reading-out of data or writing-in of data. When the command from the computer 50 designates the reading-out of data, the disk storage device 40 shifts its operation to step S62, in which the storage device 40 reads directory data DY relative to the data DT designated by the computer 50 from the non-volatile memory 30. Since the disk storage device 40 knows the address of the designated data DT through the step S62, the disk storage device 40 moves the read/write head 3 to the track T indicated by the read-out addresses in step S63, and reads out the designated data DT in step S64 and transfers the read-out data to the computer 50 in step S65.

When the command from the computer 50 designates writing-in of data, or negative in the step 61, the disk storage device 40 shifts its operation to step S66, in which the storage device 40 checks whether the directory data DY corresponding to the designated data DT from the computer is stored in the non-volatile memory or not. In case the corresponding directory data is stored in the non-volatile memory, the disk storage device 40 shifts its operation to step S68. When the stored corresponding directory data are different in their contents or the data to be stored is new, the disk storage device 40 shifts its operation to step S67, in which the disk storage device 40 renews the directory data or stores the new directory data. In step 68, the read/write head 3 is moved to the track T of the address indicated by the directory data DY, and the data DT transferred from the computer 50 is written in step S69. The data reading/writing operation completes at the end of the step S69 or the step S64.

FIG. 3(b) compares the data reading/writing operation period of the present invention and that of the prior art. The left hand side of the figure shows the time spent on the data reading/writing operation of the present invention and the right hand side of the figure shows the time spent on the data reading/writing operation of the prior art. According to the prior art, since the directory data DY is at first read, it takes about 30 milliseconds for head moving time T1 and at least 17 milliseconds for usual directory data read out time T2 corresponding to one turn of the disk 1. On the contrary, according to the present invention, since the directory data DY is read from the non-volatile memory, read-out time T12 is very short of less than 1 millisecond.

There is no difference in period of time spent on the following steps between the present invention and the prior art. Time T3 corresponding to the head moving step S63 or the step S68 of FIG. 3(a) is about 30 milliseconds which is the same as the head moving time T1. The minimum data reading/writing time T4 corresponding to the data reading/writing step S64 or the step S69 of FIG. 3(a) is 17 milliseconds which is the same as the data reading/writing time T2. As is apparent from this comparison, the reading/writing time of the data DT or access time measured from the computer 50 according to the present invention is reduced down to about a half of the prior art.

Though start of the disk 1 and reading-in of the setting data PD are assigned to the control processor 20 and the data processor 10 respectively in the embodiment described above, one single processor built in the disk storage device 40 may execute the disk starting operation and the setting data reading-in operation parallel to each other. In the above example as shown in FIG. 3(a), when the directory data DY designated by the computer 50 is not stored in the non-volatile memory 30 or when the stored directory data DY is contradict to the designated data, it is preferable to notify so to the computer 50.

When the data stored on the disk 1 is erased, it is enough to erase the corresponding directory data DY from the non-volatile memory 30. It is not always necessary to erase from disk 1 the data corresponding to the directory data. The embodiment described in FIG. 1 adopts both the starting and data reading/writing systems, but the disk storage device may adopt either one of the operation systems. Thus, the present invention is not limited to the embodiments described above and applicable in any mode without departing from the true spirit of the invention.

As described above, in the present invention, a non-volatile memory is built in the disk memory or storage device in association with its processor. In the starting system of the disk storage device, the non-volatile memory stores the setting data necessary for loading the basic program of the host computer. At starting the disk storage device, the setting data is read from the non-volatile memory to the processor in a very short time in parallel to starting of the disk, so that the computer may be accessible to the basic program immediately after completion of the starting of the disk.

In the data reading/writing system of the invention, the non-volatile memory stores the directory data of the data stored on the disk. At the reading-out of the stored data, the stored directory data is read from the non-volatile memory, and the data is read from the disk. At the data storage on the disk, directory data corresponding to the data to be stored is stored in the non-volatile memory. Thus, it is possible to eliminate the moving time of the head and the rotation time of the disk while reading, which are required conventionally in reading the setting data and the directory data from the disk, and the setting data and the directory data can be obtained from the non-volatile memory in a very short time. Thus, it is possible to reduce the time spent on starting the disk storage device and to halve the access time from the host computer.

While the invention has been explained with reference to the specific embodiments of the invention, the explanation is illustrative, and the invention is limited only by the appended claims.

What is claimed is:

1. A starting system of a disk storage device with a disk in association with a host computer, comprising:

non-volatile memory means built in said disk storage device separated from the disk and storing setting data necessary for loading a basic program of the host computer; and data processing means electrically connected to the non-volatile memory means, said data processing means reading out said setting data from said non-volatile means parallel to starting operation of rotating the disk when said host computer is started and until rotation of the disk comes to a constant rotation rate so that said host computer is accessible to said basic program stored in said disk storage device immediately after said starting operation is completed.

2. A starting system as claimed in claim 1, wherein said basic program loaded from said disk storage device to said host computer when said host computer is started comprises an operating system for the entire host computer.

3. A starting system as claimed in claim 1, wherein said non-volatile memory means comprises an electrically rewritable read only memory.

4. A starting system as claimed in claim 2, further comprising a read/write head for the disk, a control processor electrically connected to the data processing means for controlling a position of the read/write head, and a read/write circuit electrically connected to the read/write head and the data processing means to thereby transfer signal between the host computer and the disk through the read/write head, the read/write circuit and the data processing means.

5. A starting system as claimed in claim 4, wherein said disk storage device is arranged parallel to the host computer so that when the starting system starts to operate, the host computer and the disc storage device actuate simultaneously.

6. A starting system as claimed in claim 5, wherein said non-volatile memory stores directory data of the disk in addition to the setting data.

7. A starting system as claimed in claim 6, wherein said host computer includes a system therein for reading one of a basic input/output system and an input/output control program when the host computer starts to operate.

* * * * *

UNITED STATES PATENT AND TRADEMARK OFFICE
CERTIFICATE OF CORRECTION

PATENT NO. : 5,581,785
DATED : December 3, 1996
INVENTOR(S) : Kunihiro Nakamura, Yasuyuki Masunaga It is certified that error appears in the above-indentified patent and that said Letters Patent is hereby corrected as shown below:

```
    Column 1, line 2, change "AND" to --WITH--;
             line 3, delete "OF THE SAME"; and
             line 39, change "reads" to --read--.
    Column 2, line 12, change "second" to --seconds--.
    Column 3, line 33, change "second" to --seconds--.
    Column 6, line 11, change "second" to --seconds--;
             line 12, change "second" to --seconds--;
             line 18, change "millisecond" to
--milliseconds--; and
             line 21, change "second" to --seconds--.
```

Signed and Sealed this

Eighteenth Day of March, 1997

Attest:

Attesting Officer

BRUCE LEHMAN

Commissioner of Patents and Trademarks